(12) United States Patent
Feher et al.

(10) Patent No.: US 10,232,806 B1
(45) Date of Patent: Mar. 19, 2019

(54) SLIDING TOILET ENCLOSURE

(71) Applicants: Zsuzsanna Feher, Nampa, ID (US);
Bela Mihalic, Nampa, ID (US)

(72) Inventors: Zsuzsanna Feher, Nampa, ID (US);
Bela Mihalic, Nampa, ID (US)

(*) Notice: Subject to any disclaimer, the term of this patent is extended or adjusted under 35 U.S.C. 154(b) by 0 days.

(21) Appl. No.: 15/805,408

(22) Filed: Nov. 7, 2017

(51) Int. Cl.
B60P 3/34 (2006.01)
A47K 11/04 (2006.01)
B60R 15/04 (2006.01)

(52) U.S. Cl.
CPC .............. B60R 15/04 (2013.01); A47K 11/04 (2013.01); B60P 3/34 (2013.01)

(58) Field of Classification Search
CPC ........ A47K 11/04; A47K 11/06; A47K 11/08; B60P 3/34; B60R 15/04
USPC .............. 4/458, 460, 465, 467, 476–483; 296/26.03, 26.09, 26.13
See application file for complete search history.

(56) References Cited

U.S. PATENT DOCUMENTS

| 851,028 | A | | 4/1907 | Pfeffer | |
|---|---|---|---|---|---|
| 3,289,214 | A | | 12/1966 | Corliss | |
| 4,133,571 | A | * | 1/1979 | Fillios | B60P 3/34 296/165 |
| 4,944,047 | A | | 7/1990 | Gagliano | |
| 5,031,249 | A | * | 7/1991 | Sargent | B60R 15/04 4/321 |
| 5,083,324 | A | | 1/1992 | Strong | |
| D358,459 | S | | 5/1995 | Kiwarkis | |
| 5,570,924 | A | * | 11/1996 | Few | B60P 3/34 296/171 |
| 5,862,540 | A | * | 1/1999 | Chuan | B60P 3/36 4/449 |
| 5,894,698 | A | * | 4/1999 | Dewald, Jr. | E04B 1/3431 296/171 |
| 6,079,770 | A | * | 6/2000 | Bocian | B60R 15/04 296/190.01 |
| D438,941 | S | | 3/2001 | Selina | |
| 6,471,275 | B1 | * | 10/2002 | Kunz | B60P 3/34 296/171 |
| 6,681,413 | B2 | * | 1/2004 | Weiss | A47K 11/02 4/476 |
| 7,931,323 | B1 | * | 4/2011 | Del Vecchio | B60P 3/34 296/165 |
| 8,516,622 | B2 | * | 8/2013 | Schagen | B60R 15/04 4/321 |
| 2001/0030437 | A1 | * | 10/2001 | Hiebert | B60P 3/34 296/26.01 |

FOREIGN PATENT DOCUMENTS

EP 2484560 A1 8/2012

* cited by examiner

Primary Examiner — Erin Deery

(57) ABSTRACT

The sliding toilet enclosure houses a portable camping toilet which remains within the enclosure and takes up no floor space until it is needed. Activation of a control on the exterior of the housing causes a linear actuator to push the portable camping toilet, carried by a traveling toilet carrier, out of the housing. The traveling toilet carrier is directed and limited by slides that couple to the housing and to the traveling toilet carrier. The portable camping toilet may be used and then the control may be activated to cause the linear actuator to pull the traveling toilet carrier and the portable camping toilet back into the housing. The housing may be used as a seating area when the portable camping toilet is stored inside the housing.

9 Claims, 4 Drawing Sheets

SLIDING TOILET ENCLOSURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of recreational vehicle accessories, more specifically, a sliding toilet enclosure.

SUMMARY OF INVENTION

The sliding toilet enclosure houses a portable camping toilet which remains within the enclosure and takes up no floor space until it is needed. Activation of a control on the exterior of the housing causes a linear actuator to push the portable camping toilet, carried by a traveling toilet carrier, out of the housing. The traveling toilet carrier is directed and limited by slides that couple to the housing and to the traveling toilet carrier. The portable camping toilet may be used and then the control may be activated to cause the linear actuator to pull the traveling toilet carrier and the portable camping toilet back into the housing. The housing may be usable as a seating area when the portable camping toilet is stored inside the housing.

An object of the invention is to provide a storage area for a portable camping toilet that preserves floor space within an RV or other recreational vehicle.

Another object of the invention is to move the portable camping toilet between a "storage position" inside of a housing and a "use position" outside of the enclosure.

A further object of the invention is to provide a linear actuator to move the portable camping toilet between the two positions.

Yet another object of the invention is to provide an activation control that determines when the linear actuator moves the portable camping toilet.

These together with additional objects, features and advantages of the sliding toilet enclosure will be readily apparent to those of ordinary skill in the art upon reading the following detailed description of the presently preferred, but nonetheless illustrative, embodiments when taken in conjunction with the accompanying drawings.

In this respect, before explaining the current embodiments of the sliding toilet enclosure in detail, it is to be understood that the sliding toilet enclosure is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sliding toilet enclosure.

It is therefore important that the claims be regarded as including such equivalent construction insofar as they do not depart from the spirit and scope of the sliding toilet enclosure. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
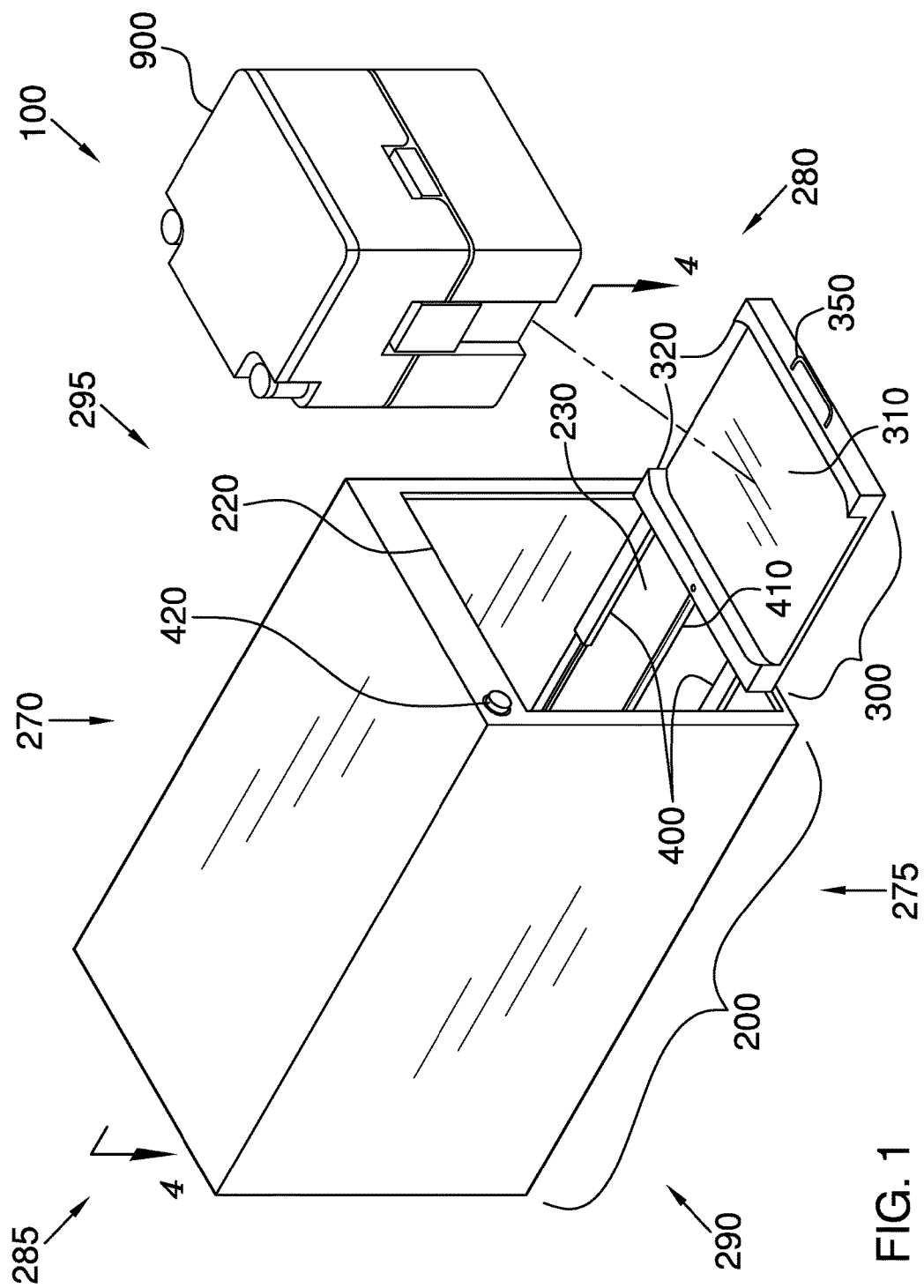
FIG. 1 is a perspective view of an embodiment of the disclosure with the traveling toilet carrier in the "use" position.
Figure 2:
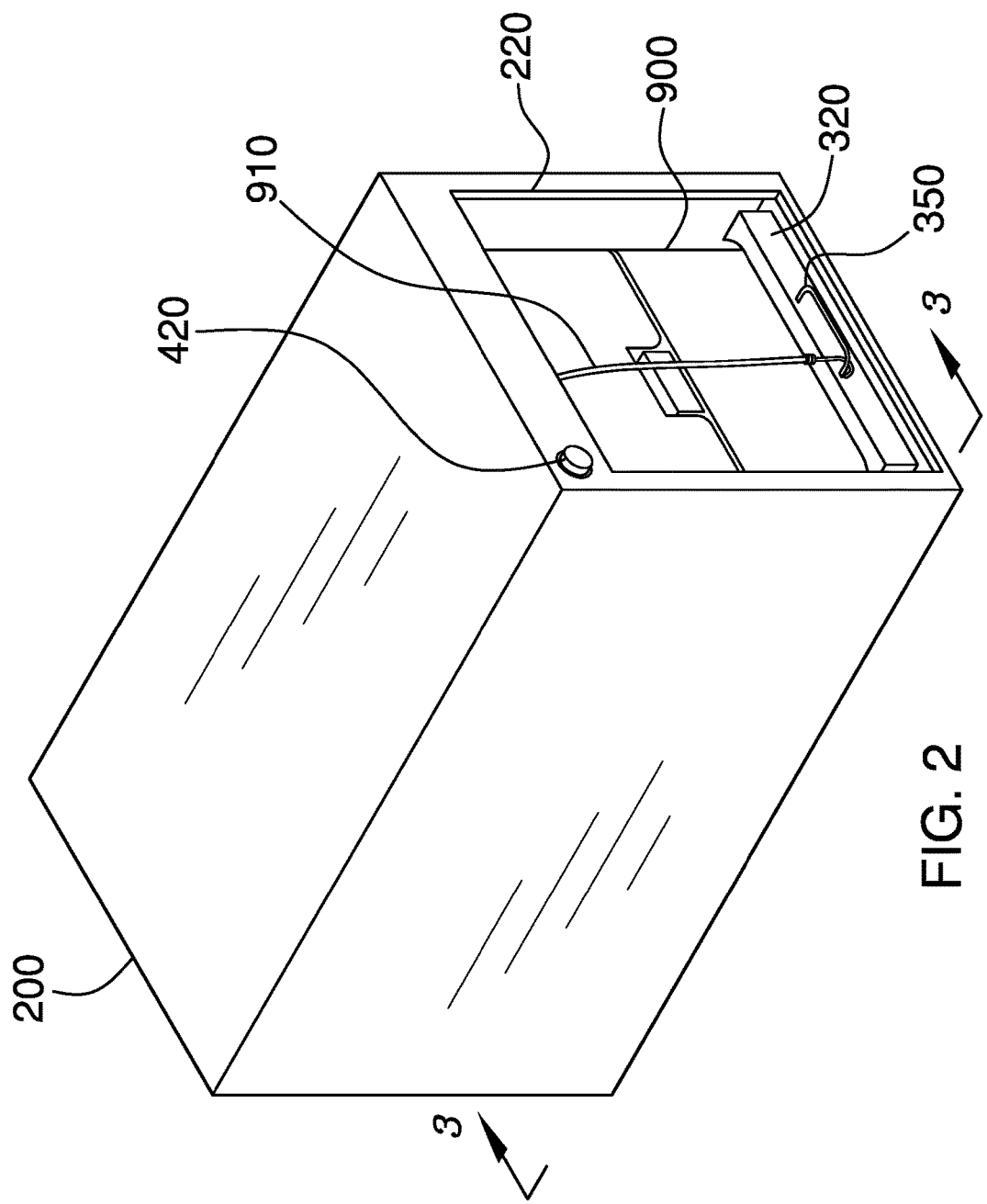
FIG. 2 is a perspective view of an embodiment of the disclosure with the traveling toilet carrier in the "storage" position.
Figure 3:
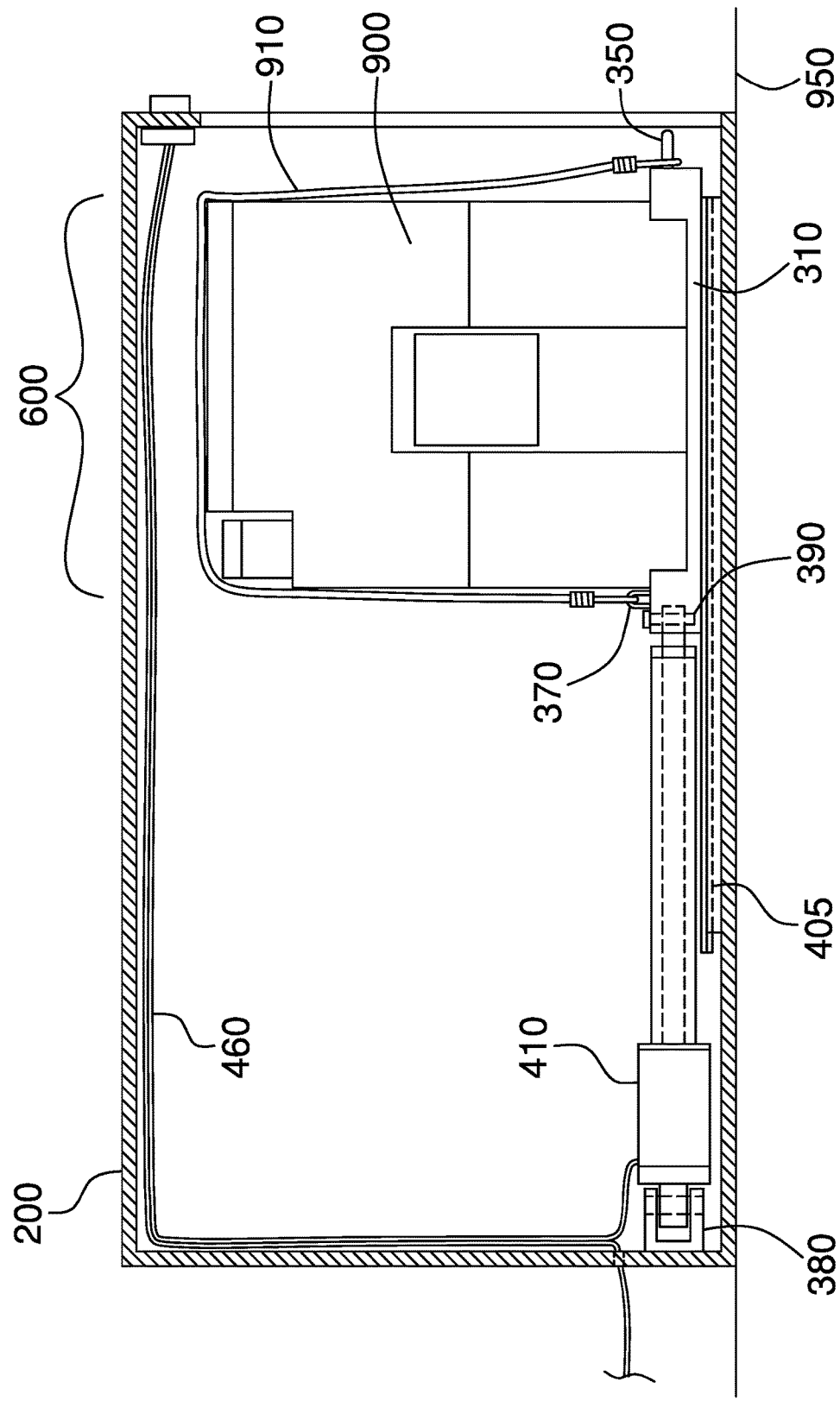
FIG. 3 is a cross-sectional view of an embodiment of the disclosure across 3-3 as shown in FIG. 2.
Figure 4:
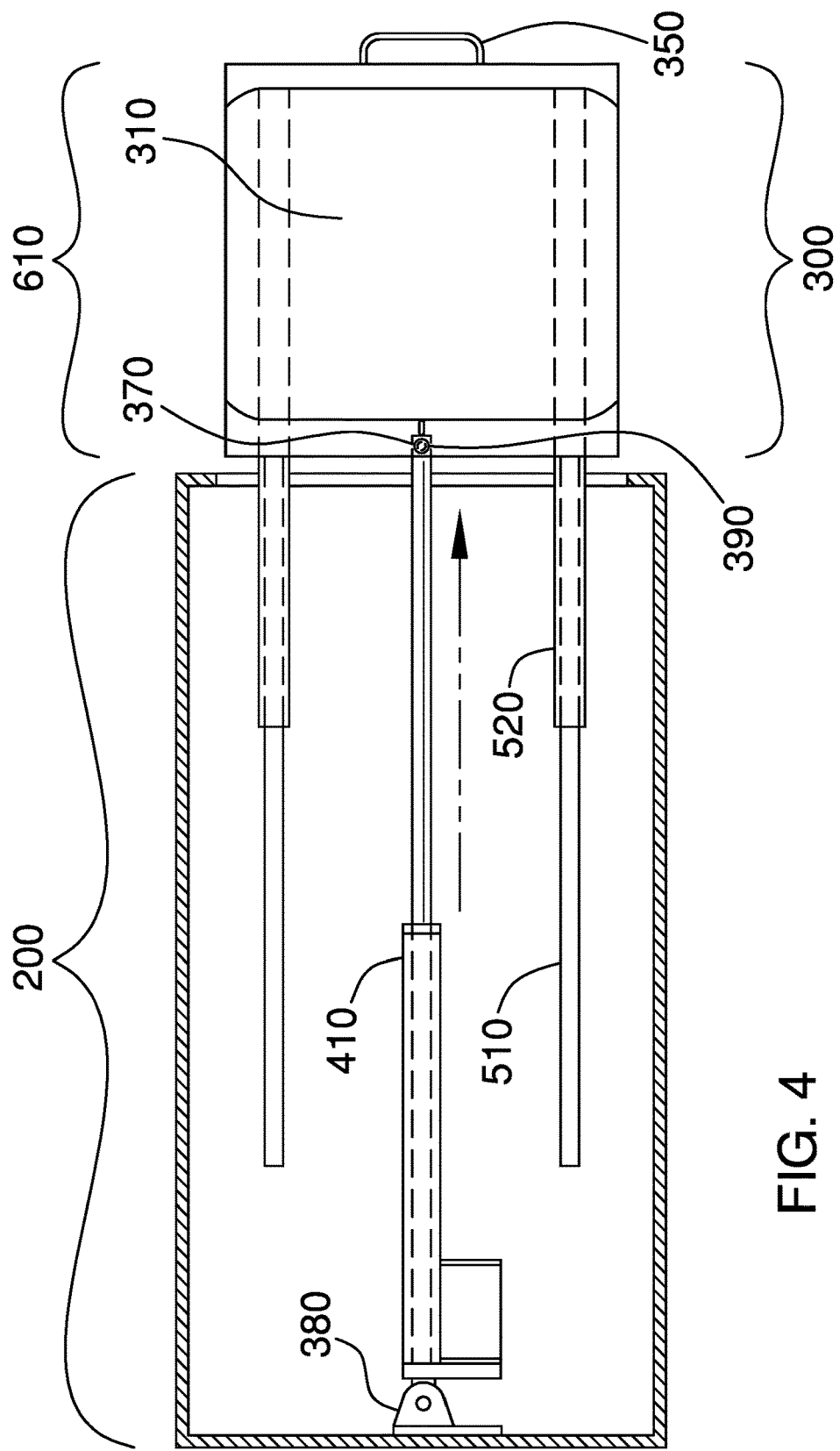
FIG. 4 is a cross-sectional view of an embodiment of the disclosure across 4-4 as shown in FIG. 1.

Detailed reference will now be made to a first potential embodiment of the disclosure, which is illustrated in FIGS. 1 through 4.

The sliding toilet enclosure 100 (hereinafter invention) comprises a housing 200, two or more slides 400, a traveling toilet carrier 300, a linear actuator 410 and an activation control 420. The invention 100 may be used within a camper, pop-up, motor home, vacation home, or RV, to move a portable camping toilet 900 between a "storage position" 600 and a "use position" 610. In the "storage position" 600, the portable camping toilet 900 is contained within the housing 200 and takes up no floor space. In the "use position" 610, the portable camping toilet 900 is moved outside of the housing 200 by the traveling toilet carrier 300 and is accessible for use. The housing 200 may be used as a seat when the portable camping toilet 900 is in the "storage position" 600.

The housing 200 may be a box-like covering for the invention 100. A top 270, a bottom 275, a left 290 side, a right 295 side, and a rear 285 of the housing 200 may be solid panels. A front 280 may comprise an aperture 220 to allow passage of the traveling toilet carrier 300 and the portable camping toilet 900. The two or more slides 400 may be coupled to a floor of the housing 230, which is the bottom 275 interior of the housing 200. The activation control 420 may be coupled to the front 280, the left 290 side, the right 295 side, or the top 270 of the housing 200 where it is accessible from the exterior of the housing 200.

The two or more slides 400 allow the traveling toilet carrier 300 to move into and out of the housing 200. An individual slide 405 selected from the two or more slides 400 comprises a bottom slide bracket 510 and a top slide bracket 520. The bottom slide bracket 510 and the top slide bracket 520 are slidably coupled to each other. Specifically, the top slide bracket 520 may slide past the bottom slide bracket 510 in a longitudinal direction while being prevented from moving a lateral direction relative to the bottom slide bracket. Either the bottom slide bracket 510 or the top slide bracket 520 or both may include stops to prevent longitudinal motion beyond a predetermined range of motion.

The top slide bracket 520 may couple to the underside of the traveling toilet carrier 300. The bottom slide bracket 510 may couple to the floor of the housing 230.

The two or more slides 400 may be oriented to run from the front 280 of the housing 200 towards the rear 285 of the housing 200. The two or more slides 400 may be placed such that the within 6 inches of the aperture 220. The two or more slides 400 extend towards the rear 285 of the box by a distance that is 50% to 100% of the distance from the aperture 220 to the rear 285 panel of the housing 200.

When the traveling toilet carrier 300 is in the "storage position" 600, each of the top slide brackets 520 is vertically aligned with the bottom slide bracket 510 associated with it so that each of the individual slides 405 take up their minimum horizontal extent. This results in the traveling toilet carrier 300 and the portable camping toilet 900 being positioned inside of the housing 200 and adjacent to the aperture 220.

When the traveling toilet carrier 300 is in the "use position" 610, each of the top slide brackets 520 are extended in a horizontal direction towards the front 280 relative to the bottom slide bracket 510 associated with it so that the individual slides 405 take up their maximum horizontal extent. This results in the traveling toilet carrier 300 and the portable camping toilet 900 being positioned outside of the housing 200. The length of the two or more slides 400 is selected so that when the traveling toilet carrier 300 is in the "use position" 610, the traveling toilet carrier 300 and the portable camping toilet 900 move forward to a point where the portable camping toilet 900 clears the housing 200.

The traveling toilet carrier 300 comprises a toilet platform 310 upon which the portable camping toilet 900 may be placed. The toilet platform 310 may be a rectangular platform that is oriented to be parallel to the floor 950. The traveling toilet carrier 300 may further comprise one or more raised edges 320 to prevent the portable camping toilet 900 from sliding off of the toilet platform 310. The traveling toilet carrier 300 may comprise a handle 350 and one or more anchor loops 370. The handle 350 may be used to manually slide the traveling toilet carrier 300 into or out of the housing 200. The one or more anchor loops 370 may be used to hold a bungee cord 910 in place over the top of the portable camping toilet 900 to keep the portable camping toilet 900 closed and to prevent movement of the portable camping toilet 900 while the invention 100 is being transported.

The linear actuator 410 may be located within the housing 200 and may be coupled between an actuator bracket 380 and the traveling toilet carrier 300. The actuator bracket 380 may be coupled to an interior surface of the housing. The coupling between the linear actuator 410 and the traveling toilet carrier 300 may comprise an actuator pin 390. Upon activation by an electrical potential the linear actuator 410 will expand or contract in a longitudinal direction. Expansion of the linear actuator 410 results from the application of the electrical potential having a first polarity. Contraction of the linear actuator 410 results from the application of the electrical potential having a second polarity.

When the linear actuator 410 expands, the linear actuator 410 applies a force between the actuator bracket 380 and the traveling toilet carrier 300. The direction of the force pushes the traveling toilet carrier 300 away from the actuator bracket 380 thus moving the traveling toilet carrier 300 and the portable camping toilet 900 out of the housing 200. The path and distance of the traveling toilet carrier 300 movement is constrained by the two or more slides 400.

When the linear actuator 410 contracts, the linear actuator 410 applies a reverse force between the actuator bracket 380 and the traveling toilet carrier 300. The direction of the reverse force pulls the traveling toilet carrier 300 towards the actuator bracket 380 thus moving the traveling toilet carrier 300 and the portable camping toilet 900 into the housing 200.

The source of the electrical potential may be an electrical system (not illustrated in the figures) of a vehicle (not illustrated in the figures) into which the invention 100 is installed. Embodiments of the invention 100 may accept either 12 VDC, other DC voltage levels, or 120 VAC. As non-limiting example, 12 VDC may be provided by a lead-acid battery or equivalent in within the vehicle or 120 VAC may be provided by a power inverter. The electrical potential may reach the invention 100 via wiring 460.

The activation control 420 may be an electrical switch that determines when the electrical potential from the vehicle is allowed to reach the linear actuator 410 and whether the electrical potential is to be the first polarity or the second polarity. As a non-limiting example, the activation control 420 may be a double-pole, double-throw, center-off rocker switch. The electrical potential from the vehicle may arrive at the activation control 420 via the wiring 460. If the activation control 420 is in an 'off' position then the electrical potential is prevented from travelling any further over the wiring 460. If the activation control 420 is in an 'on' position, then the electrical potential may travel over the wiring 460 to reach the linear actuator 410. The activation control 420 may determine whether the electrical potential reaching the linear actuator 410 has the first polarity or the second polarity and, thus, whether the linear actuator 410 will expand to move the portable camping toilet 900 out of the housing 200 or contract to pull the portable camping toilet 900 into the housing 200.

As used herein, an "anchor loop" is a mechanical device comprising a flat plate with an attached circular or semi-circular ring. The plate may have one or more mounting holes for attaching to a base object and the ring is used to secure a strap, rope, or bungee cord to the base object.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may be construed to mean recharging or replacing individual cells, individual batteries of cells, or a package of multiple battery cells as is appropriate for any given battery technology that may be used.

As used in this disclosure, the term "bungee" refers to an elastic cord or a mesh of elastic cords.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", mean connected, either directly or indirectly and does not necessarily imply a mechanical connection.

As used in this disclosure, "DC" is an acronym for direct current.

As used in this disclosure, the word "exterior" is used as a relational term that implies that an object is not located or contained within the boundary of a structure or a space.

As used in this disclosure, a "floor" refers to a bottom or base.

As used in this disclosure, a "handle" is an object by which a tool, object, or door is held or manipulated with the hand.

As used in this disclosure, "horizontal" is a directional term that refers to a direction that is parallel to a supporting surface. Unless specifically noted in this disclosure, the horizontal direction is always perpendicular to the vertical direction.

As used in this disclosure, a "housing" is a rigid casing that encloses and protects one or more devices.

As used in this disclosure, the word "interior" is used as a relational term that implies that an object is located or contained within the boundary of a structure or a space.

As used in this disclosure, the term "lateral" refers to a direction that is parallel to a central or longitudinal axis.

As used herein, a "linear actuator" is a device that produces linear motion. The device may be electromechanical, hydraulic, or pneumatic in nature. Upon activation by an electrical potential or by a change in fluid or air pressure, the overall length of the device may change—either by lengthening or shortening. In use, a first component of the linear actuator, which may be referred to as a motor or body, is fixed mounted to a first object and a second component of the linear actuator, which may be referred to as an actuator arm or lead screw, is fixed mounted to a second object. Activation of the device may cause the second component to linearly move relative to the first component thus changing the distance between the first object and the second object.

As used herein, the word "longitudinal" refers to a lengthwise direction.

As used in this disclosure, a "motor" refers to the method of transferring energy from an external power source into mechanical energy.

As used herein, a "recreational vehicle" or "RV" is a vehicle that is designed for recreational purposes, such as for camping.

As used in this disclosure, a "switch" is an electrical device that starts and stops the flow of electricity through an electric circuit by completing or interrupting an electric circuit.

As used in this disclosure, "VAC" is an abbreviation for alternating current voltage.

As used in this disclosure, "VDC" is an abbreviation for direct current voltage.

As used in this disclosure, a "vehicle" is a device that is used for transporting passengers, goods, or equipment.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A sliding toilet enclosure comprising:
a housing, two or more slides, a traveling toilet carrier, a linear actuator and an activation control;
wherein the sliding toilet enclosure is used within a group consisting of a camper, pop-up, motor home, vacation home, or RV, and moves a portable camping toilet between a "storage position" and a "use position";
wherein in the "storage position", the portable camping toilet is contained within the housing and takes up no floor space;
wherein in the "use position", the portable camping toilet is moved outside of the housing by the traveling toilet carrier and is accessible for use;
wherein the housing is usable as a seat when the portable camping toilet is in the "storage position";
wherein the housing comprises top, bottom, left side, right side, and rear solid panels, and wherein the housing covers the portable camping toilet;
wherein a front of the housing comprises an aperture to allow passage of the traveling toilet carrier and the portable camping toilet;
wherein the two or more slides are coupled to a floor of the housing;
wherein the activation control is coupled to the front, the left side, the right side, or the top of the housing where the activation control is accessible from an exterior of the housing;
wherein the two or more slides allow the traveling toilet carrier to move into and out of the housing;
wherein an individual slide selected from the two or more slides comprises a bottom slide bracket and a top slide bracket;

wherein the bottom slide bracket and the top slide bracket are slidably coupled to each other;
wherein the top slide bracket slides past the bottom slide bracket in a longitudinal direction while being prevented from moving in any lateral direction relative to the top slide bracket;
wherein either the bottom slide bracket or the top slide bracket or both includes stops to prevent longitudinal motion beyond a predetermined range of motion;
wherein the bottom slide bracket couples to the floor of the housing; wherein the top slide bracket couples to an underside of the traveling toilet carrier;
wherein the two or more slides are oriented to run from the front of the housing towards the rear of the housing;
wherein the two or more slides are placed such that a front of each slide is placed at or within 6 inches of the aperture;
wherein the two or more slides extend towards the rear of the housing by a distance that is 50% to 100% of the distance from the aperture to the rear of the housing;
wherein when the traveling toilet carrier is in the storage position, each of the top slide brackets is vertically aligned with the associated bottom slide bracket so that each slide takes up a minimum horizontal extent;
wherein when the traveling toilet carrier is in the storage position, the traveling toilet carrier and the portable camping toilet are positioned inside of the housing and adjacent to the aperture;
wherein when the traveling toilet carrier is in the use position, each of the top slide brackets are extended in a horizontal direction towards the front relative to the associated bottom slide bracket associated so that the individual slides take up a maximum horizontal extent;
wherein when the traveling toilet carrier is in the use position, the traveling toilet carrier and the portable camping toilet are positioned outside of the housing;
wherein the length of each of the two or more slides is selected so that when the traveling toilet carrier is in the use position, the traveling toilet carrier and the portable camping toilet move forward to a point where the portable camping toilet clears the housing;
wherein the traveling toilet carrier comprises a toilet platform upon which the portable camping toilet is placed;
wherein the toilet platform is a rectangular platform that is oriented to be parallel to the floor;
wherein the traveling toilet carrier comprises a handle and one or more anchor loops;
wherein the handle is used to manually slide the traveling toilet carrier into or out of the housing;
wherein the one or more anchor loops hold a bungee cord in place over a top of the portable camping toilet to keep the portable camping toilet closed and to prevent movement of the portable camping toilet while the sliding toilet enclosure is being transported.

2. The sliding toilet enclosure according to claim 1
wherein the traveling toilet carrier further comprises one or more raised edges to prevent the portable camping toilet from sliding off of the toilet platform.

3. The sliding toilet enclosure according to claim 1
wherein the linear actuator is located within the housing;
wherein the linear actuator is coupled between an actuator bracket and the traveling toilet carrier;
wherein the actuator bracket is coupled to an interior surface of the housing;
wherein the coupling between the linear actuator and the traveling toilet carrier comprises an actuator pin.

4. The sliding toilet enclosure according to claim 3
wherein upon activation by an electrical potential the linear actuator will expand or contract in a longitudinal direction;
wherein expansion of the linear actuator results from the application of the electrical potential having a first polarity;
wherein contraction of the linear actuator results from the application of the electrical potential having a second polarity.

5. The sliding toilet enclosure according to claim 4
wherein when the linear actuator expands, the linear actuator applies a force between the actuator bracket and the traveling toilet carrier;
wherein the direction of the force pushes the traveling toilet carrier away from the actuator bracket thus moving the traveling toilet carrier and the portable camping toilet out of the housing;
wherein the path and distance of the traveling toilet carrier movement is constrained by the two or more slides.

6. The sliding toilet enclosure according to claim 5
wherein when the linear actuator contracts, the linear actuator applies a reverse force between the actuator bracket and the traveling toilet carrier;
wherein the direction of the reverse force pulls the traveling toilet carrier towards the actuator bracket thus moving the traveling toilet carrier and the portable camping toilet into the housing.

7. The sliding toilet enclosure according to claim 6
wherein the source of the electrical potential is an electrical system into which the sliding toilet enclosure is installed;
wherein the electrical potential reaches the sliding toilet enclosure via wiring.

8. The sliding toilet enclosure according to claim 7
wherein the activation control is an electrical switch that determines when the electrical potential is allowed to reach the linear actuator and whether the electrical potential is to be the first polarity or the second polarity.

9. The sliding toilet enclosure according to claim 8 wherein the activation control is a double-pole, double-throw, center-off rocker switch.

* * * * *